United States Patent [19]
Tung

[11] Patent Number: 6,010,783
[45] Date of Patent: Jan. 4, 2000

[54] CLEAR MONOLAYER LABEL FILMSTOCK

[75] Inventor: Harvey C. Tung, Newark, Ohio

[73] Assignee: The Dow Chemical Company, Midland, Mich.

[21] Appl. No.: 09/011,629

[22] PCT Filed: Sep. 24, 1996

[86] PCT No.: PCT/US96/15291

§ 371 Date: Feb. 12, 1998

§ 102(e) Date: Feb. 12, 1998

Related U.S. Application Data

[60] Provisional application No. 60/004,334, Sep. 26, 1995, abandoned.

[51] Int. Cl.⁷ ........................................................ B32B 7/12
[52] U.S. Cl. ............................ 428/343; 428/354; 428/516
[58] Field of Search ..................................... 428/40.1, 343, 428/354, 516, 520

[56] References Cited

U.S. PATENT DOCUMENTS

| | | |
|---|---|---|
| Re. 32,929 | 5/1989 | Ewing . |
| 4,713,273 | 12/1987 | Freedman . |
| 4,888,075 | 12/1989 | Freedman . |
| 4,946,532 | 8/1990 | Freeman . |
| 5,151,309 | 9/1992 | Dollinger . |
| 5,562,962 | 10/1996 | Tung ................................... 428/349 X |
| 5,756,173 | 5/1998 | Tung et al. ............................ 428/40.1 |
| 5,849,419 | 12/1998 | Josephy et al. ..................... 428/354 X |

*Primary Examiner*—Daniel Zirker

[57] ABSTRACT

A monolayer or multilayer label filmstock having low haze while maintaining sufficient stiffness and die-cuttability to be used in a deformable, pressure-sensitive label. The low haze allows the deformable labels to be substantially clear. The label filmstock comprises a polymer blend of a polyolefin and a glassy polymer.

5 Claims, No Drawings

CLEAR MONOLAYER LABEL FILMSTOCK

This application claims benefit of U.S. Provisional Application No. 60/004,334, filed Sep. 26, 1995, now abandoned.

This invention relates to polymer resin blends generally, and more specifically but without limitation to resin blends useful for making film capable of being made into labels (that is, label filmstock) such as deformable, pressure-sensitive labels. This invention also relates to labels generally, and more specifically but without limitation to deformable, pressure-sensitive labels and to label filmstock for making such labels.

It is well known in the art to use thermoplastic label filmstock for making labels that are preferable in many respects to paper labels. Deformable thermoplastic labels desirably are resistant to moisture, tearing, cracking, creasing, wrinkling, shrinking, etc. These properties are especially important when the labels are applied to squeezable or otherwise deformable substrates.

For making labels, label filmstock is generally used in conjunction with an adhesive layer for adhering the label filmstock to a selected substrate. The adhesive is generally selected so that when the label filmstock is adhered to the substrate, the strength of the label filmstock-adhesive interface, the strength of the substrate-adhesive interface, and the cohesive strength of the adhesive itself are all greater than the forces required for deformation and recovery of the label filmstock. The adhesive should be sufficient to enable the label to accomplish its intended purpose for the reasonable lifetime of a deformable container. Pressures sensitive adhesives are preferable and include the acrylic and styrene-butadiene adhesives.

For making labels, label filmstock is also generally used in conjunction with a release liner. The release liner is releasably bonded to the adhesive until the label filmstock/adhesive is suitably peeled away from or dispensed from the liner and adhered to a flexible or deformable substrate. The release liner may be any suitable conventionally known liner material for labeling applications.

In order to be successfully used as label filmstock for deformable, pressure-sensitive labels, a film should also meet three additional general requirements: good optics, die-cuttability, and appropriate stiffness. Whether a label filmstock has good optics is application dependent. In some cases, a low haze high gloss film is required. In other cases, a higher haze, lower gloss film is required. For example, blow molded high density polyethylene bottles may have a 60 degree gloss from 19–36 percent, as measured by ASTM D 2457, while some polypropylene blow molded bottles may have a 60 degree gloss up to 80 percent.

In terms of die-cuttability, a film/adhesive/release liner composite desirably should be die-cuttable on a rotary die at commercial manufacturing speeds without web breaks or damage to the liner. When a film is not very die-cuttable, then more sophisticated and expensive release liners must be used.

In terms of stiffness, a label filmstock must be sufficiently stiff to dispense easily from a release liner, but not too stiff that it wrinkles or deforms when applied to a deformable container.

Polystyrene-based label filmstocks are generally sufficiently die-cuttable and stiff. The stiffness of these polystyrene-based label filmstocks allows for good machine processability in label application equipment, but limits their utility on deformable substrates because labels made from these polystyrene-based label filmstocks wrinkle when applied to a deformable substrate.

U.S. Pat. No. 5,151,309 issued to Dollinger ("Dollinger") discloses a label filmstock comprising a polystyrene blend. The label filmstock of Dollinger is die-cuttable and has good stiffness. However, the label filmstock of Dollinger has very high haze due to the polystyrene blend component. This high haze precludes the use of Dollinger label filmstock in clear labels.

Polyethylene label filmstocks, such as disclosed in Re. 32,929 issued to Ewing ("Ewing"), can be formulated to meet a range of optical and stiffness requirements, but are difficult to die-cut and to dispense from a release liner in labeling equipment because of their elongation and yield characteristics. Fillers may be added to polyethylene label filmstocks to control die-cuttability, but the addition of fillers limits the optical properties possible. Highly oriented polyethylene label filmstocks have improved die-cuttability but have deficiencies due to the optical properties obtainable as well as excessive stiffness. A filmstock having excessive stiffness is generally unable to be successfully utilized in a deformable label (that is, a label to be adhered to a deformable substrate).

The present invention provides label filmstock having an improved combination of optics, die-cuttability, and stiffness. In one aspect, the present invention provides a label filmstock having low haze while maintaining sufficient stiffness and die-cuttability to be used in a deformable, pressure-sensitive label. This low haze allows label filmstock of the present invention to be made into labels for deformable substrates that are substantially clear.

Label filmstock of the present invention may be a monolayer or a multilayer film. Preferably, label filmstock of the present invention is a monolayer film. In any case, at least one layer (or the only layer in a monolayer film) of the present invention comprises a polymer blend of a polyolefin and glassy polymer. The polyolefin is the most prevalent component in film labelstock of the present invention and generally comprises at least about 50 weight percent of the label filmstock. Preferred polyolefins include copolymers of ethylene and octene and blends of low density polyethylene ("LDPE") and high density polyethylene ("HDPE"). Generally, the glassy polymer does not comprise more than about 50 weight percent of the label filmstock, and preferably, does not comprise more than about 25 weight percent of the label filmstock. Preferred glassy polymers include poly(methyl methacrylate) ("PMMA") and styrene-acrylonitrile polymer ("SAN").

Label filmstock of the present invention optionally may contain other materials in addition to the polyolefin and glassy polymer components, so long as these other materials in the amounts contemplated do not unduly interfere with achieving the desired combination of optics, stiffness, and die-cuttability. These optional materials include pigments, such as titanium dioxide; compatibilizers; and printability-enhancing polymers, such as copolymers of ethylene and acrylic acid ("EAA").

The present invention provides label filmstock having reduced haze while maintaining sufficient stiffness and die-cuttability to be used in deformable, pressure-sensitive labels. Stiffness of label filmstock of the present invention was determined by measuring the machine direction 1 percent secant modulus using ASTM D 882. Generally, label filmstock of the present invention should have a machine direction 1 percent secant modulus of less than about 100,000. Preferably, label filmstock of the present invention will have a machine direction 1 percent secant modulus of about 50,000.

It should be noted that the stiffness of label filmstock in general can be increased by increasing the thickness of the filmstock. However, label filmstock of the present invention is generally no more than about 5 mils thick, and preferably no more than about 4 mils thick. Label filmstock of the present invention is generally at least about 2 mils thick, and preferably at least about 3 mils thick.

Determining whether label filmstock exhibits sufficient die-cuttability is somewhat subjective in nature. Generally, this determination is made by incorporating the filmstock into a filmstock/adhesive/release liner composite structure by methods well known in the art and die-cutting the composite structure on a rotary die at commercial manufacturing speeds to see if there are web breaks or damage to the release liner. However, a lower ultimate elongation of the label filmstock is believed to be an indication of enhanced die-cuttability of a filmstock/adhesive/release liner composite structure. Machine direction ultimate elongation for label filmstock of the present invention was measured by ASTM D 882. Generally, label filmstock of the present invention will exhibit an ultimate elongation of less than about 400 percent.

The haze of films of the present invention was measured using ASTM D 1003. The haze level needed in label filmstock of the present invention depends on the particular application. However, it is a feature of the present invention that when compared to known label filmstock, label filmstock of the present invention can be produced that exhibits lower haze while maintaining substantially similar stiffness and die-cuttability. This lower haze allows label filmstock of the present invention to be made into substantially clear labels for deformable substrates. To prepare substantially clear labels from label filmstock, the label filmstock should exhibit a haze value of less than about 60 percent, and preferably, about 50 percent or less.

Generally, label filmstock of the present invention comprises a blend of at least one polyolefin and a glassy polymer. The exact amount of each component will vary somewhat depending on the desired characteristics of the resulting label filmstock. For example, the amount of glassy polymer present can be adjusted depending on the haze level desired. Generally, adding more glassy polymer will increase the haze level and lowering the amount of glassy polymer present will lower the resulting haze level. Also, the amount of glassy polymer needed to produce a particular haze level will vary depending on the particular type of glassy polymer utilized. However, the amounts of the components needed to produce an embodiment of the present invention can be discerned from the teachings herein without undue experimentation. For the purposes of this application all percentage amounts disclosed will be weight percentages unless stated otherwise.

These polymer blends can be used to produce either monolayer or multilayer filmstock using techniques well known in the art. Preferably, label filmstock of the present invention is a monolayer film. However, the present invention contemplates a multilayer label filmstock comprising at least one layer having the same composition as would a monolayer label filmstock of the present invention.

The predominant component in polymer blends useful in producing label filmstock of the present invention is one or more polyolefins. Accordingly, the polyolefin component generally comprises at least about 50 percent of the label filmstock.

The kinds of polyolefins useful in making label filmstock of the present invention are generally known in the art and include polyethylenes; polypropylenes; and copolymers of ethylene and octene, propylene, acrylate monomers, vinyl acetate, acrylic acid, methyacrylic acid, ionomers of acrylic acid, or ionomers of methyacrylic acid; and mixtures thereof.

A preferred polyolefin to be used in label filmstock of the present invention is a copolymer of ethylene and octene. One such copolymer is DOWLEX 2247 (available from The Dow Chemical Company). DOWLEX 2247 has a melt index of 2.7 and a density of 0.917 g/cc. Another preferred polyolefin to be used in label filmstock of the present invention is a blend of low density polyethylene ("LDPE") and high density polyethylene ("HDPE"). Additionally, including small amounts (that is, generally not more than about 10 weight percent) of a copolymer of ethylene and acrylic acid ("EAA") tends to enhance the printability of the label filmstock. An example of such an EAA copolymer is Primacor 1410 (available from The Dow Chemical Company).

Label filmstock of the present invention also contains a glassy polymer. For purposes of this application, a glassy polymer is a polymer having a glass transition temperature greater than the temperature at which the resulting label filmstock will be used. When incorporated into labels, a composite label filmstock/adhesive/release liner structure will typically undergo a die-cutting operation at approximately 100° F. (37.8° C.). Accordingly, glassy polymers useful in the present invention will typically have a glass transition temperature greater than about 100° F. (37.8° C.).

Glassy polymers preferred for use in the present invention include poly(methyl methacrylate) ("PMMA") and styrene-acrylonitrile polymer ("SAN"). PMMA is generally more preferred than SAN. The precise amount of glassy polymer utilized in label filmstock of the present invention depends on the particular glassy polymer utilized and the combination of optics, stiffness, and die-cuttability desired.

As the weight percent of glassy polymer in a filmstock decreases, the machine direction ultimate elongation of the filmstock increases. Label filmstock having lower ultimate elongation is usually more die-cuttable than label filmstock having higher ultimate elongation. Generally, label filmstock of the present invention will exhibit a machine direction ultimate elongation of less than about 400 percent as measured by ASTM D 882. Label filmstock should ultimately be tested for die-cuttability on commercial equipment at commercial manufacturing speeds.

Also, as the amount of glassy polymer present in filmstock increases, the 1 percent secant modulus of the filmstock increases. The amount of glassy polymer present in filmstock of the present invention should not be so much as to cause the 1 percent secant modulus to be greater than about 100,000. Generally, the amount of glassy polymer present in label filmstock of the present invention is less than 50 percent, and preferably, less than 25 percent.

It should be noted that label filmstock of the present invention may contain other materials in addition to the polyolefin and glassy polymer components, so long as these other materials in the amounts contemplated do not unduly interfere with achieving the desired combination of optics, stiffness, and die-cuttability. For example, a conventional pigment such as titanium dioxide may be added to the label filmstock. Generally, no more than about 10 percent by weight of titanium dioxide is needed to achieve a white label suitable for printing. However, greater amounts of titanium dioxide could be added so long as there is no undue interference with achieving the desired combination of optics, stiffness, and die-cuttability.

Additionally, a compatibilizer may be added to label filmstock of the present invention. If added to label filmstock of the present invention, compatibilizers generally will be present in amounts less than about 10 weight percent. Although a compatibilizer is not a critical element of the present invention, the present invention contemplates that utilizing a compatibilizer could realize certain processing advantages, such as reduced die-face buildup during extrusion of label filmstock of the present invention.

a release liner. The film containing 0 weight percent glassy polymer (that is, ultimate elongation of 1000) was not die-cuttable, whereas the film containing 33 weight percent HIPS was die-cuttable.

TABLE I

Haze (percent)

| Glassy Polymer | Weight Percent of Glassy Polymer | | | | | |
|---|---|---|---|---|---|---|
| | 0 percent | 5 percent | 10 percent | 15 percent | 20 percent | 25 percent | 33 percent |
| HIPS | 3 | | | | | 98 | |
| GPPS | 3 | 73 | | 92 | | 95 | |
| SAN | 3 | 35 | | 71 | | 76 | 83 |
| PMMA | 3 | | 22 | | 41 | 48 | |

TABLE II 1 percent Secant Modulus (psi)

| Glassy Polymer | Weight Percent of Glassy Polymer | | | | | | |
|---|---|---|---|---|---|---|---|
| | 0 percent | 5 percent | 10 percent | 15 percent | percent | 25 percent | 33 percent |
| HIPS | | | | | | | 65,000 |
| GPPS | 15,800 | 21,000 | | 32,100 | | 54,000 | |
| SAN | 15,800 | 25,700 | | 51,600 | | 77,700 | 102,500 |
| PMMA | 15,800 | | 29,300 | | 55,800 | 74,100 | |

TABLE III

Ultimate Elongation (percent)

| Glassy Polymer | Weight Percent of Glassy Polymer | | | | | | |
|---|---|---|---|---|---|---|---|
| | 0 percent | 5 percent | 10 percent | 15 percent | 20 percent | 25 percent | 33 percent |
| HIPS | 1,000 | | | | | | 450 |
| GPPS | 1,000 | 700 | | 900 | | 600 | |
| SAN | 1,000 | 1,000 | | 900 | | 200 | 200 |
| PMMA | 1,000 | | 1,000 | | 200 | 150 | |

EXAMPLES

Monolayer films were prepared using a cast film process. Each film was 3.5 mils thick. Each film consisted of a blend of Dowlex 2247 and one of four glassy polymers. The four glassy polymers used were a general purpose polystyrene ("GPPS") (Styron 665, available from The Dow Chemical Company), a high impact polystyrene ("HIPS") (Styron 404, available from The Dow Chemical Company), a styrene acrylonitrile ("SAN") (Tyril 990, available from The Dow Chemical Company), and a poly(methyl methacrylate) ("PMMA") (V920, available from Atohaas).

Films with various weight percentages of glassy polymer were tested for haze via ASTM D 1003, machine direction 1 percent secant modulus via ASTM D 882, and machine direction ultimate elongation via ASTM D 882. Tables I–III show the results of these tests.

The film containing 0 weight percent glassy polymer and the film containing 33 weight percent HIPS were further evaluated for die-cuttability at a commercial die manufacturer (ROTO-DIE) after adhesive coating and lamination to Monolayer films were prepared using a cast film process. Each film was 3.5 mil thick. Three films consisted of 85 weight percent of a low density polyethylene having a melt index of 1.9 and a density of 0.925 g/cc (LDPE 535, available from The Dow Chemical Company) and 15 weight percent of a glassy polymer. The glassy polymers utilized were GPPS (Styron 665), SAN (Tyril 990), and PMMA (V920). A fourth film consisted of 100 weight percent LDPE 535. Each film was tested for haze, machine direction ultimate elongation, and 1 percent secant modulus. The results can be found in Table IV.

The 100 weight percent LDPE films appear to have good haze and ultimate elongation values. However, as taught in U.S. Pat. No. 5,151,309 issued to Dollinger, polyethylene label filmstock is difficult to die cut and to dispense from a liner in labeling equipment.

TABLE IV

| Glassy Polymer | Haze (percent) | Ultimate Elongation (percent) | 1 percent Secant Modulus (psi) |
|---|---|---|---|
| None | 5 | 400 | 20,600 |
| GPPS | 80 | 220 | 59,600 |
| SAN | 78 | 200 | 62,900 |
| PMMA | 58 | 140 | 45,000 |

Two additional films were prepared using a cast film process. Each film contained 42 weight percent of low density polyethylene (LDPE 681, available from The Dow Chemical Company), 40 weight percent of high density polyethylene, HDPE 058620, available from The Dow Chemical Company), 10 weight percent of a glassy polymer, and 8 weight percent of a copolymer of ethylene and acrylic acid (Primacor 1410, available from The Dow Chemical Company). The glassy polymer used in the first film (Film V-1) was a polystyrene (Styron 680, available from The Dow Chemical Company) and the glassy polymer used in the second film (Film V-2) was PMMA (V-920, available from Atohaas). Film V-1 was 3.66 mils thick and Film V-2 was 3.73 mils thick. Each film was tested for machine direction ultimate elongation, machine direction 1 percent secant modulus, and haze.

TABLE V

| Property Tested | Film V-1 | Film V-2 |
|---|---|---|
| Elongation | 282 | 176 |
| percent 1 Modulus | 80,675 | 66,684 |
| Haze | 62.5 | 51.5 |

What is claimed is:
1. A monolayer label filmstock, comprising:
   a) greater than about 50 percent by weight of a polyolefin component, said polyolefin component consisting essentially of a blend of high density polyethylene and low density polyethylene;
   b) no more than about 50 percent of a glassy polymer; and
   c) no more than about 10 percent by weight of a copolymer of ethylene and acrylic acid.
2. A deformable label suitable for attachment to a selected substrate, comprising:
   a) the label filmstock of claim 1; and
   b) an adhesive layer for adhering said filmstock to the selected substrate.
3. A deformable label according to claim 2, wherein said label filmstock exhibits a haze of less than 60 percent as measured by ASTM D 1003.
4. A deformable label according to claim 2, wherein the glassy polymer is either a poly(methyl methacrylate) or a styrene-acrylonitrile polymer.
5. A deformable label according to claim 2, wherein said label filmstock further comprises titanium dioxide.

* * * * *